June 2, 1936.  R. GOUIRAND  2,042,596

PNEUMATIC SUSPENSION

Filed June 11, 1932  3 Sheets-Sheet 1

RENÉ GOUIRAND
INVENTOR.

BY Cornelius Zabriskie
ATTORNEYS.

June 2, 1936.  R. GOUIRAND  2,042,596
PNEUMATIC SUSPENSION
Filed June 11, 1932    3 Sheets-Sheet 2

INVENTOR.
RENÉ GOUIRAND
BY
ATTORNEY.

June 2, 1936.　　　R. GOUIRAND　　　2,042,596

PNEUMATIC SUSPENSION

Filed June 11, 1932　　　3 Sheets-Sheet 3

RENE GOUIRAND
INVENTOR
BY Cornelius Zabriskie
ATTORNEYS

Patented June 2, 1936

2,042,596

UNITED STATES PATENT OFFICE 2,042,596

PNEUMATIC SUSPENSION

Renè Gouirand, New York, N. Y.

Application June 11, 1932, Serial No. 616,627

19 Claims. (Cl. 280—124)

This invention relates to pneumatic suspension means for use in connection with vehicle bodies and more particularly motor vehicles. It contemplates the employment of pneumatic suspension of the body of the vehicle from the axles or spindles thereof, either entirely through the employment of pneumatic principles or in conjunction with the use of springs.

The invention embodies many novel features directed more particularly to improvements in and the development of pneumatic suspension means described and claimed in my Patent No. 1,555,199, issued September 29, 1925, and has to do especially with a more efficient arrangement of pneumatic suspension with improvements in means for practically carrying out the same. These novel features will be set forth in detail in the following description, in the accompanying drawings, and in the appended claims.

The accompanying drawings illustrate different practical embodiments of the invention, but the constructions therein shown are to be understood as illustrative, only, and not as defining the limits of the invention.

Figures 1, 4:
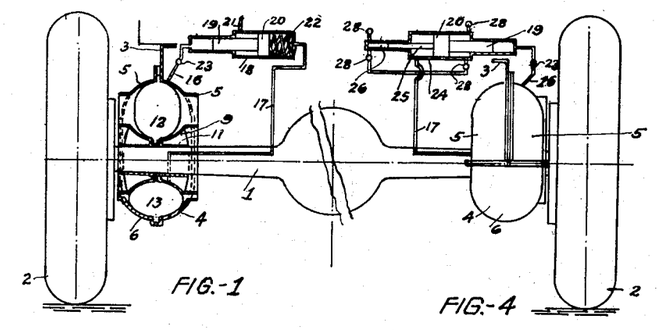
Figure 1 is an elevation of a wheel and axle assembly showing in section pneumatic suspension means embodying the present invention.
Figures 4–15 show different modified forms of the invention in a diagrammatic manner.
Figures 2, 3:
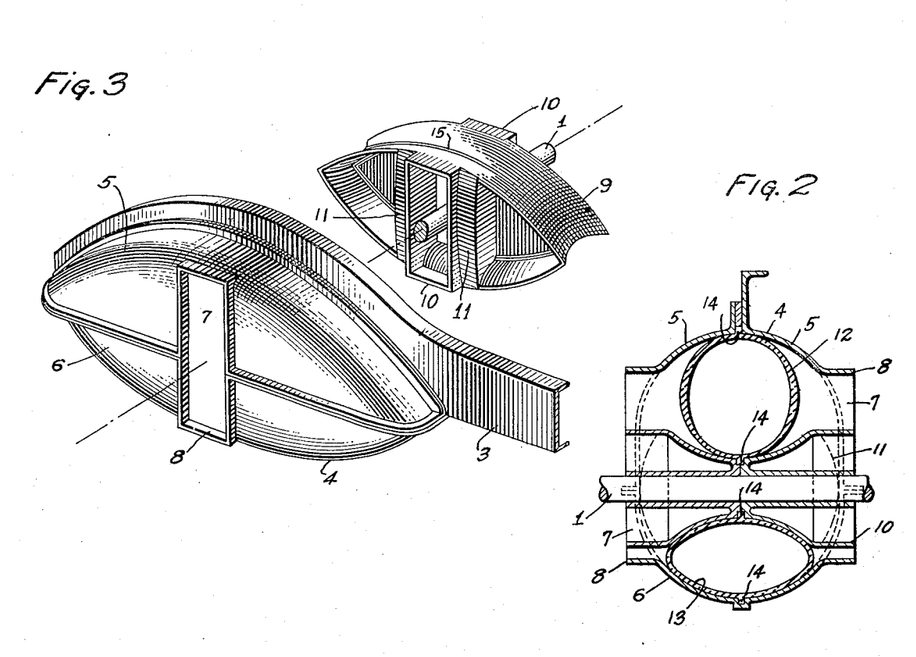
Figure 2 is a fragmentary enlarged section of the pneumatic suspension means of Figures 1 and 4.
Figure 3 is a perspective detail showing one efficient manner of associating the suspension mechanism of Figures 1 and 2 with the axle of the vehicle and the chassis frame.

Referring first to Figures 1–3 inclusive, I designates an axle of a vehicle provided with a wheel 2, while 3 designates the chassis frame of such vehicle. In the form of the invention illustrated in these figures, the chassis frame is formed, as shown in Figures 2 and 3, with a housing 4 shown as fabricated from three sections, two sections 5 forming the upper half, and one section 6 forming the lower half. These sections are suitably flanged to one another, and bolted, riveted or welded together. This housing constitutes an inherent part of the frame construction in this showing, although it may be made separate and secured thereto in either a permanent or detachable manner without departing from this invention. The opposite sides of the housing 4 are provided with openings 7 formed within the flanges 8 at both sides of the housing and within the housing is positioned a carrier 9 having laterally extending bosses or flanges 10 adapted to extend through the opening 7 and cooperate with the flanges 8 to guide the carrier for movement within the housing.

The carrier 9 is preferably rigidly secured to the axle 1 after the manner shown in Figure 2, so as to be positioned within the housing, i. e., to be housed therein. At either side of the bosses 10, the carrier is provided with arcuate bearing surfaces 11, adapted to bear against the inner lateral walls of the housing to preclude appreciable relative sidewise lost motion, and at the same time permit of transverse tilting of the axle which may result, for example, when one wheel drops into a hole in a roadway or when such wheel rises to pass over an elevation in the roadway.

Interposed between the carrier and the housing are two pneumatic cushions, shown best in Figure 2. The upper cushion 12 is interposed between the carrier and the top wall of the housing, while the lower cushion 13 is interposed between the carrier and the bottom wall of the housing. The carrier and the housing are so shaped that the walls thereof which coact with the cushions are curvilinear and concave, so as to present smooth appropriately shaped surfaces to the cushions and thereby better cooperate therewith while the cushions are expanded or contracted and deformed during these operations.

It is possible to use in connection with certain figures of the drawings, hereinafter described, cushions having substantially uniform wall sections, but I find it highly desirable in the structure which is now being described and in others presently to be explained, to construct these cushions along well defined lines in order that they may function with the highest degree of efficiency. For example, the upper cushion shown in Figure 2 is preferably made with side walls which are relatively stiff, while the bottom and top walls of the cushion are less stiff and more flexible or resilient in their nature.

The purpose of this construction is to insure the desired resiliency in the cushion in order to obtain maximum cushioning effect of the pneumatic pressure and at the same time preclude lateral bulging of the side walls when this cushion is subjected to maximum pressures under external shocks or stresses. The top and bottom of the cushion has the support of the housing and carrier. It is the unsupported area which is thickened. In order that the cushion may be maintained in the predetermined position with its strengthened side walls as shown in Figure 2, this upper cushion 12, as well as the lower cushion 13 are preferably provided with longitudinal ribs at their tops and bottoms and these ribs are adapted to seat in channels 15 in the surfaces with which they cooperate to hold the cushions in position.

The upper cushion 12 has been described as having strengthened side walls and fairly flexible or resilient top and bottom walls. The cushion 13 is preferably formed according to this embodiment of the invention with a relatively stiff wall throughout and one strongly tending to partake under normal conditions of an elliptical shape with its greater axis horizontal. When deformed under pressure, it tends to assume a circular section. When there is no differential pressure arrangement introduced between the upper system and the lower system, the tendency is for the upper cushion to flatten unduly and the lower to inflate unduly owing to the weight of the vehicle being on the upper cushion alone, viz., the lower cushion is thicker and stronger.

By making the cushions 12 and 13 in the manner described, I obtain a further important function having to do more particularly with the ability to obtain a differential condition between the upper and lower cushions through the utilization of substantially the same pressures in both and without the necessity of imposing any mechanism in the conduit or air passage between such cushions. By differential condition, I mean the ability of the upper cushion to properly carry or support the weight of the chassis frame from the running gear without necessitating an undue compression of the upper cushion or an undue expansion of the lower cushion. In other words, when the cushions are formed as stated, the upper cushion will properly support the weight of the chassis frame and at the same time the lower cushion will properly expand to at all times engage with the carrier 9.

This may be more fully explained as follows. As is well understood in physics, the internal pressures in a closed vessel act upon the walls of such vessel in equal pressures in all directions. Therefore, in order to retain a vertical elliptical shape, I have strengthened the side walls in such manner as to resist deformation from the elliptical shape. The upper and lower wall of the cushion being of less strength than the side walls tend to elongate in a vertical direction and thus acts upon the upper housing section and the upper surface of the carrier.

On the contrary, the lower cushion has a wall of substantially uniform stiffness throughout its entire circumference. This lower cushion is, however, as stated, fabricated so that it will normally partake of a horizontal elliptical cross section. By virtue of the resiliency of this cushion, however, it is possible, by introduction of air thereinto above the normal pressure, to cause such air to deform said lower cushion into a state of substantially circular contour. In other words, in the normal operation of the device, the upper cushion is deformed from an upright elliptical contour into a horizontal elliptical contour, while the exact converse may be accomplished with respect to deformation of the lower cushion.

The cushions have been referred to as provided with ribs 14, which, in practice, are secured by bolts, rivets or otherwise within the channels 15. Consequently, under the normal condition of the parts with the car, for example, at rest, the parts appear substantially as shown in Figure 2. Assuming, however, that the upper and lower cushions are connected by an appropriate bypass of any suitable character, such, as shown in my prior patent heretofore referred to, the operation of overcoming a shock received by a wheel will be substantially as follows.

Under normal conditions with the cushions connected as specified, the parts will appear as in Figure 2. However, if the wheel associated with the axle 1 strikes an obstruction, the axle 1 will be quickly elevated. If, however, the wheel encounters an obstruction which causes the axle 1 to rapidly rise, the resulting shock tends to vertically deform the upper cushion 12 from a vertical elliptical cross section to a horizontal elliptical section, whereas the lower cushion is deformed from a horizontal elliptical section to a substantially circular section. This deformation of the cushions is accompanied by a rapid rush of air from the upper cushion to the lower cushion, brought about conjointly by the momentary increased pressure due to compression of the upper cushion and the simultaneous momentary slight suction in the lower cushion, which suction is caused primarily by the fact that the flanges 14 are secured in the channels 15. It is possible, however, due to excessive shock or inertia for the axle, with its carrier 9, to be elevated somewhat more than is necessary to permit the lower cushion to assume a truly circular contour in which event the lower cushion may under abnormal conditions momentarily partake of vertical elliptical shape, but this is an abnormal condition and will result from only the most severe shocks which would be apt to break the conventional spring constructions.

During these operations, the tendency at all times is for the pressures in the upper and lower chambers to remain equal in both. In other words, the pressure in the lower chamber may be momentarily decreased and the pressure in the upper chamber momentarily increased but the tendency is for these pressures to assume a normally equal relation. As soon as the axle tends to resume its normal position of Figure 2, the relation of the pressures in the upper and lower cushions is reversed with the result that the air in the lower cushion tends to flow back into the upper cushion, but as stated in my prior patent a slow leak check valve is preferably included in the air connection between the cushions, so that the return of air from the lower to the upper cushion in order to assume the balanced condition, is relatively slow so as not to give an undesirable rebound.

It is to be noted that because of the peculiar formation of the respective cushions a predetermined amount of air pressure acting upon both of them will produce the following effect. Pressure on the upper cushion will be restrained from transverse action by the thickened side walls but will act directly upon the relatively thin upper and lower walls to function with maximum efficiency in the support of the chassis frame. On the contrary, the same amount of pressure within the lower cushion will be offset to an appreciable degree by the thick relatively rigid walls thereof with the result that the upper cushion will support the weight of the chassis frame with maximum efficiency while the lower cushion will not have an appreciable downward pressure upon said chassis frame. As a result, I am able to obtain with the same pressure in both cushions a differential effect by virtue of the inherent properties of the cushions per se and without necessitating the employment of differential mechanism or differential pressures between said cushions.

Cushions associated with the axle and chassis frame as described are, in accordance with the structure of Figure 1, interconnected for interacting operation in any one of several ways hereinafter more fully described. However, with reference to Figure 1 in particular, the upper cushion 12 is connected to the lower cushion 13 through lines of tubing 16 and 17 between which is interposed a differential pressure mechanism 18. This mechanism comprises a compound piston having a small area portion 19 and a larger area portion 20. The tubing 16 extends from the upper cushion to the end of the cylinder in which the smaller piston 19 operates, while the tubing 17 from the lower cushion communicates with the larger end of the cylinder head of the larger piston section 20. The central portion of the cylinder is vented at 21 to the atmosphere or to the vacuum produced by the engine.

In this form of the invention, the upper cushion or system of cushions is adapted to carry air pressure somewhat in excess of the pressure of the lower cushion or system of lower cushions in order that the upper cushion may better support the weight of the vehicle. It is for this purpose that the differential mechanism is employed and the pressure in the lower cushion acting upon the larger end of the piston 20 is assisted by a spring 22 to produce through the differential mechanism described a substantially balanced condition under ordinary loading of the vehicle.

It is to be understood that the differential piston areas are not to be too great because it may then resolve itself into too great a volume being forced into the lower cushions. In its preferred form, the volume displaced in the upper cushion should equal the volume introduced in the lower cushion. The differential in pressure is then accomplished by adjustable spring 22 alone.

If, however, the vehicle wheel 2 strikes an obstruction and causes the carrier to react against the upper cushion 12, to further compress the same, a corresponding increase of pressure will result against the smaller end 19 of the piston and cause a sufficient movement of such piston to enhance the volume with but little increase in pressure in the lower cushion 13 and thereby enable the same to better withstand the tendency of the body of the vehicle to rebound as a result of such shock. To stablize the return of the parts to normal condition after the obstruction has been passed, a slow leak check valve 23 is preferably included in the tubing 16, so that the return of the parts to normal condition may be accomplished in a relatively leisurely manner in order to produce a smooth operation. It is also to be understood that it is desirable, when compressing the upper cushions 12 and thereby compressing and enlarging the space in cushion 13, to maintain contact between cushions 12 and 13 with arcuate surfaces of 9 and 4 to reduce the lateral movement to a minimum.

When the axle of the vehicle is supported at both ends by the mechanism which I have described in connection with Figure 1, it is entirely feasible to connect the tubing 16 between the check valve 23 and the upper cushions together by a tubing extending transversely of the vehicle so that corresponding parts of the same mechanism will be interconnected as stated. When this is done, the cushioning devices at opposite sides of the vehicle will interact to produce smooth riding qualities at both lateral halves of the vehicle.

The structure of Figure 4 is in many respects similar to that of Figure 1 in that it employs a differential mechanism 24 with the upper cushion connected to the smaller piston 19 and the lower cushion connected with the larger end of the piston 20. The upper end of the piston, however, is extended to form a still smaller piston 25 operating in the small cylinder 26 and so functioning that this differential mechanism may operate as a one or two stage compressor as will be clearly understood from my former patent hereinbefore referred to.

Conventional valves 28 are provided for inlet and discharge. The operation of this structure is practically the same as shown in Figure 1 with the exception that in addition the relative movements between the axle and the chassis frame are utilized to produce compressed fluid for suitable work.

Figures 5, 6:
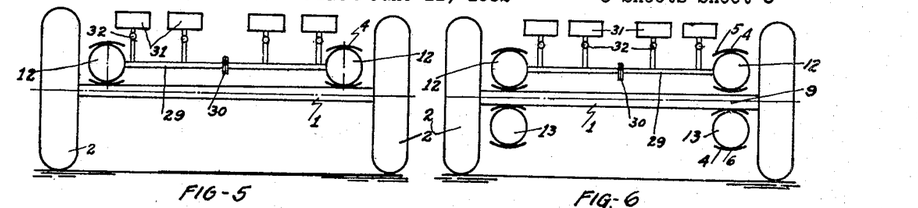

Referring now to Figure 5, it will be noted that the two lateral halves of the axle 1 are provided with upper cushions 12 only, there being no lower cushions. These cushions are connected to one another by a tube 29 provided therein with an orifice 30 of small size, and on either side of this orifice the sections of the tube 29 are connected with one or more clearance chambers 31 through branch lines having therein slow leak check valves 32. When one of the wheels strikes an obstruction which tends to elevate the corresponding side of the chassis frame, the air in the corresponding cushion 12 is compressed and caused to rapidly pass into the clearance chambers 31 and through the orifice 30 into the other cushion 12 which tends to lift the other side of the chassis frame and keep it level. The orifice is relatively small or constricted and consequently will pass out quantities of air, by weight, according to the differences in pressures on opposite sides thereof. For example, if substantially the same pressures exist on opposite sides of the orifice there will obviously be no passage of air therethrough. If the air pressure is slightly raised on one side or the other of the orifice, the air will of course pass in equal quantities, by weight, through the orifice in either direction. However, if the pressure on one side of the orifice is instantaneously or suddenly materially raised, air will pass through the orifice away from the side of greater pressure with high velocity and in greater weights per unit of time, than it will return through the orifice when the cause of this instantaneous pressure ceases. Consequently, if one of the wheels of the vehicle strikes an obstruction, e. g., a bump in the road, while the vehicle is traveling at high speed, the pressure in the upper cushion on the side corresponding to the wheel will be suddenly increased to a high degree and this so-called impact pressure will be greatly in excess of the pressure in the corresponding cushion at the other side of the vehicle. Consequently, the sudden rise in pressure on the impact pressure side will cause the air from the latter side to rush with high velocity and in appreciable weights through the orifice in an attempt to establish a balanced pressure between the said two cushions. However, as soon as the obstruction is passed, the pressure on the impact side is quickly relieved allowing the corresponding cushion to return to its normal condition. Upon this occurrence, it will be apparent that the pressure in the cushion on the non-impact side will be greater than the present pressure in the cushion on the impact side and consequently the air will move in a retrograde direction through the orifice, but obviously at a much less velocity for a longer time than it had previously moved upon impact. As a result, the movement of air through the orifice to regain the condition of equilibrium is of less velocity and consequently of less weight per unit of time than it was during impact.

If the cushion at one side were not connected as stated, the sudden impact would cause a marked deformation of the cushion with a resulting reaction which would bring about a continued vibratory action of diminishing character until the cushion finally came to a normal condition of rest. If, however, the cushions are connected, as stated, with an interposed orifice, the impact pressure, built up practically instantaneously, forces its way through the orifice with high velocity and in considerable weight during a relatively small period of time, and thus dissipates the energy of the shock in the passage of the air through the orifice. There is consequently a minimum resulting vibration, if any, and said cushion reassumes its normal condition through the return of the air in a retrograde direction through the orifice at a slower speed, but this retrograde feed involves a greater period of time with lower velocity due to the relatively less difference in pressures during the period of this retrograde feed.

It may be noted in this connection that instantaneous impact pressures are not infrequently twice that of uniform loading, and if this is borne in mind, the functioning of the orifice will be clear. The purpose of the clearance chambers 31 is to lower the terminal pressure of compression. The air forced from either cushion into the chambers 31 is free to pass the check valves 32 in a more or less unobstructed way, but returns to the cushions slowly past said check valves, and thereby gives a smooth operation during the return of the parts to normal position.

While the weight of air or the quantity entrapped within the closed system is constant, it is possible to vary the weight of air in use by employing a plurality of chambers of the character specified by providing in each branch line a valve whereby any one or more of these chambers may be cut out of or into operation if desired. In carrying out this form of the invention, I may use one or more chambers or I may eliminate the chambers entirely and use merely the orifice 30 in the connecting tube 29. The greater the number of chambers in operation produces the lesser terminal pressure when cushion 12 is compressed. The greater number of chambers in operation gives the maximum weight of air under operation. Reduction of the number of chambers results in a higher terminal pressure when cushion 12 is compressed and a lesser weight of air in operation assuming an equal displacement of axle relative to the chassis.

By connecting the two lateral cushions 12 to one another, I obtain a cushioning effect and at the same time compensate or offset the action of one cushion on the frame by a similar action by the other cushion, and thus I minimize distortion of the frame as will be understood.

The structure of Figure 6 is in many respects similar to the structure of Figure 5 with the exception that the axle is fitted with lower cushions 13 separate and independent of one another, although if desired, they may be connected with the upper cushions after the manner shown in Figures 1 and 4. The advantage of this construction is that the lower cushions have a snubbing effect and function to preclude rebound of the parts.

Figures 7, 8:
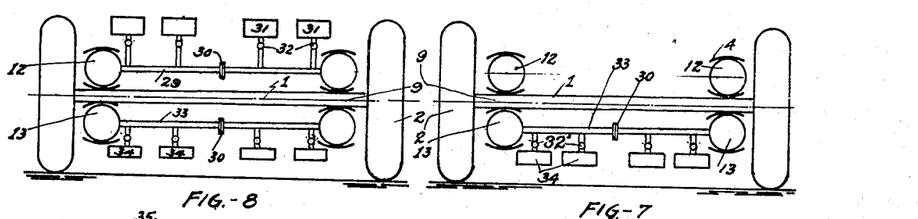

The structure shown in Figure 7 is a direct reversal of the structure shown in Figure 6, that is to say, the lower cushions are connected with a tube 33 corresponding with the tube 29 and having therein an orifice 30 and clearance chambers 34 connected with the tube 33 by branch lines having therein slow leak return check valves 32' which permit the rapid discharge from chamber 34 to cushion 13, but a comparatively slow return from 13 to 34.

In this construction, the cushions 12 act to support the chassis frame while the cushions 13 and chambers 34 act as an improved snubbing device, i. e., an improved riding control. In such an arrangement, valves are preferably included between pipe 33 and each compression chamber, so that these chambers can be selectively cut in or cut out and said valves may be made controllable from the instrument board in a manner similar to that described in my prior patent. With this arrangement, the greater the number of chambers 34 cut in, the greater will be the snubbing action.

The structure of Figure 8 shows both the upper cushions connected and the lower cushions connected with an orifice in each connection.

When the left hand wheel in this construction strikes an obstruction which elevates the left end of the axle, the upper left hand cushion is compressed with the result that the corresponding side of the chassis frame is slightly elevated, and simultaneously the lower left hand cushion is deformed vertically. Simultaneously pressure from the upper left hand cushion is communicated to the upper right hand cushion vertically deforming the same and accordingly the right hand side of the chassis frame is elevated correspondingly at least in part to the elevation which has occurred at the left hand side of the frame. The vertical distortion of the right hand upper cushion will place the lower right hand cushion under greater pressure and the pressure therein produced will be communicated to the left into the lower left hand cushion and will serve to offset or minimize the shock received as specified. The entire system therefore establishes a compensating effect throughout to maintain a transverse leveling effect of the chassis at all times.

It is also to be understood that a differential mechanism can likewise be employed between the upper system of tubing and the lower system of tubing.

In this figure, there is a combination of the characteristics illustrated in Fig. 5 and that of Fig. 7. That is clearance volumes are introduced into both upper and lower systems of tubings and the springiness of the upper system is subject to change at the will of the operator, as well as the variance in snubbing action of the lower system of cushions.

Figure 9:
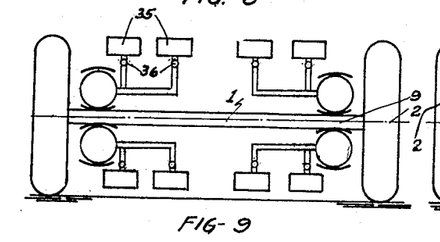

The structure of Fig. 9 shows each of the four cushions provided with one or more clearance chambers 35 connected therewith through tubing including slow leak return check valves 36. In practice, the upper cushions may be arranged in this manner without lower cushions at all, or vice versa in conjunction with conventional spring suspension or either upper or lower cushions may be arranged as shown in this figure, while the other cushions are without connection or with any other suitable connection as shown in any of the other figures of the drawings.

The structure of Fig. 9 when utilizing one or more clearance chambers as shown, functions with a fixed or predetermined weight of air which is unchanged during the operation of the apparatus, but valves may be provided to permit manual variation as described in my prior patent.

Figure 10:
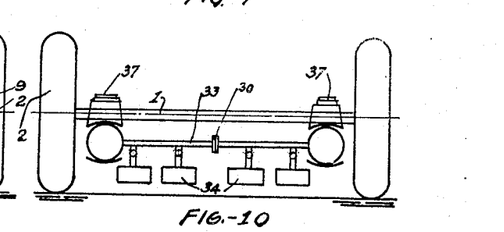

The structure shown in Figure 10 is substantially the same as that shown in Figure 7 with the exception that, while the lower set of cushions are connected as shown in Figure 7, a pair of conventional springs 37 take the place of the upper cushions 12 in said figure. Thus, the weight of the car is carried by the springs 37, while the snubbing action is minimized by the cushions and their associated orifice and/or clearance chambers.

Figure 11:
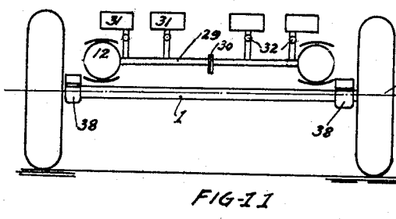

In Figure 11, the structure is substantially as shown in Figure 5 with the addition of conventional leaf springs 38 acting in conjunction with the upper cushions.

Figure 12:
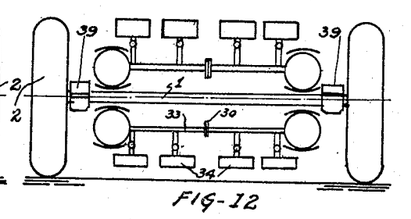

In Figure 12, the structure is the same as in Figure 8 with the addition of steel springs 39.

Figure 13:
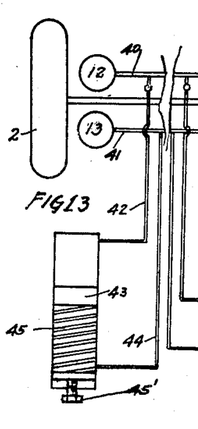

In Figure 13, the upper cushions are connected to one another and the lower cushions are connected to one another by suitable tubes 40 and 41. The upper tube 40 is connected by a tube 42 to one end of a cylinder having therein a piston 43, while the tube 41 is connected by a tube 44 to the other end of the cylinder. Both surfaces of the piston are of the same area but a spring 45 acts against that side of the piston which is acted upon by pressure from the lower cushion. In this arrangement, the lower cushion is adapted to carry a less pressure than the upper cushion and an adjustable spring 45 is sufficiently strong, so that the pressure in the lower cushion plus the pressure of the spring is sufficient to counterbalance the pressure in the upper cushion. The desired differential in pressure may be maintained by varying the compression of spring 45 by screw 45'.

Figure 14:
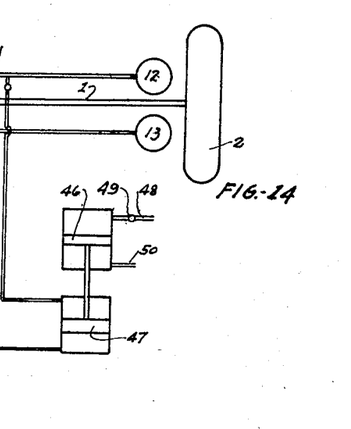

In the structure of Figure 14, the same general arrangement exists except that instead of utilizing a spring 45 to balance the pressure, this balance is effected by a vacuum from the engine acting upon the upper side of a piston 46 which is connected to a piston 47 corresponding to the piston 43. A tube 48 leads to the engine where the vacuum is produced and said tube is provided with a check valve 49 to hold the vacuum above the piston 46. The under side of the piston is vented at 50.

Figure 15:
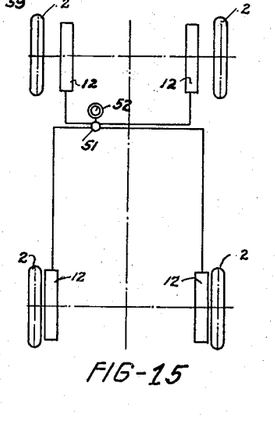

In accordance with the present invention, the upper and lower cushions associated with each wheel may be connected to one another and/or with the cushions associated with the corresponding wheel at the opposite side of the vehicle. It is also within the purview of this invention to connect all of the upper cushions of the several wheels to a suitable valve 51, as shown in Figure 15 and to associate with this valve a pressure scale 52 to read in pounds pressure or weight. This valve 51 may conveniently be a four way valve, so that the tubes connecting with each of the several upper cushions may be selectively placed in communication with the scale 52 and the readings independently obtained.

If the sum of the readings of all four cushions is thus obtained the weight of the body of the vehicle and its contents may be determined sufficiently accurate for commercial purposes. This feature of the invention entirely obviates the necessity of independent weighing of all four wheels of a truck at depots, set up by traffic authorities in order to safeguard roads and bridges from excess weight carried by the trucks. Said arrangement, moreover, can be employed with most of the forms of the invention illustrated in the drawings and contemplated by this invention.

Figure 16:
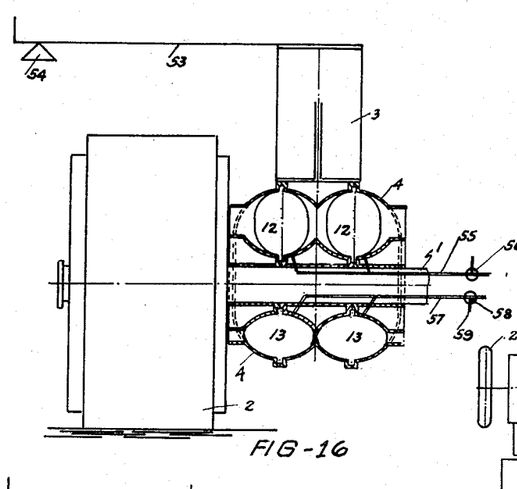
Figures 16 and 17 are elevations, partly in section of a truck suspension embodying this invention and showing the manner in which the parts may be manipulated to relieve the truck of a removable truck body.
Figure 17:
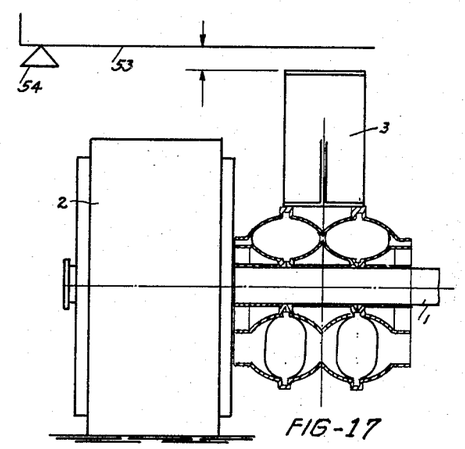

I have referred to the use of the invention on the trucks. Figures 16 and 17 graphically illustrate one important practical feature of the invention when applied to its use in this connection. These figures contemplate movement in a truck with a removable body. Trucks of this kind are well known and when it is desired to remove the body, it is the practice to jack the body up sufficiently to release it from the chassis and the chassis is thereupon moved from under the body and shifted into a position to take up another body which has been loaded or unloaded in the meantime.

With the present invention, it is possible to move the truck into the desired position with the upper cushions 12 inflated. The body indicated at 53 is thereupon shored up by horses or trestles 54 without necessitating the lifting of the body and its weight and thereupon the upper cushions 12 are deflated as shown in Figure 17 to lower the chassis frame out of contact with the body as illustrated in this figure, so that the chassis can be driven from beneath the body and the body left in stationary supported position. This arrangement of course requires that the upper cushions have tubing connections 55 leading to a suitable valve 56 which may vent these tubing connections to the atmosphere for the purpose of deflating said cushions and lowering the chassis frame and also for sealing the vent when the frame has been lowered enough and placing said connections in communication with a suitable source of air under pressure to return into the upper cushions air under predetermined operating pressure.

It is also possible to utilize the general construction shown in Figures 16 and 17 to facilitate the changing of tires without the necessity of manual jacking. This can be accomplished by adding to the construction of Figures 16 and 17 pipe lines 57 leading from the two lower cushions 13 to a two way valve 58 adapted to vent the cushions through an outlet 59 or to connect the cushions to a source of pneumatic pressure supply 60. When this arrangement is added, the apparatus is susceptible of the following operation.

In the event of a flat tire or the necessity of changing a tire or wheel, a block, stone or other appropriate support is thereupon placed beneath the casing section 4 to constitute a support therefor. Valve 58 is moved to admit compressed air to the cushions 13 while valve 56 is moved to vent the fully inflated cushions 12. This forces the chassis frame upwardly to its fullest extent. The cushions 12 are vented and pressure is supplied to the cushion 13 with the result that the chassis frame is supported on the stone or block while the axle is raised to elevate the wheel and tire from the ground and facilitate changing thereof. After the tire or wheel has been changed, it is only necessary to operate the valves 56 and 58 to restore predetermined operating pressures in the cushions.

I have hereinbefore in connection with the several figures of the drawings referred to tubing connections between several cushions. I wish it understood that these tubing connections are of a sufficient size to permit a practically unrestricted passage of air under pressure therethrough. These cushions are therefore of relatively large size so that the passage of air will not be so constricted as to render the operation of the apparatus sluggish or to nullify its functions. In most cases, the passage of air in one direction is relatively rapid, while the passage of air in the opposite direction may be slower, but where the movement of the air is slowed down, this is accomplished through the employment of an orifice or slow leak return check valve. If the tubes are too small, they restrict the operation of the device and defeat the purpose for which it is intended.

In practically carrying out this invention, it will be understood that the running gear including the axle and the wheels may be of any suitable and approved type and that the frame of the vehicle may be made independently of the body of the vehicle and secured thereto or may form an inherent part of the body construction.

The openings 7 in the opposite sides of the housing are preferably provided with boots or plates above and below the projections 10 of the carrier, so as to close the space above and below the part 10 at each side of the housing and still permit of the vertical movement of the core with respect to the housing, so that dirt, mud or other extraneous matter cannot enter into the housing and for the purpose of entirely sealing the housing at both sides thereof.

Having thus fully described the invention, what I claim as new and desire to secure by Letters Patent is:

1. A vehicle comprising a running gear, and a frame, in combination with a pneumatic suspension system embodying pneumatic cushioning means connecting the running gear and the frame at opposite sides of the frame, a conduit connecting the cushioning means at one side of the frame to the cushioning means at the other side thereof to permit the passage of fluid under pressure from one cushioning means to the other, a constricted orifice included in said conduit for controlling the passage of air under pressure therethrough, and at least one clearance chamber communicating with the conduit on each side of said air controlling means, said pneumatic suspension system being hermetically sealed with respect to the outer atmosphere during the normal operation thereof.

2. A vehicle comprising a running gear, and a frame, in combination with a pneumatic suspension system embodying pneumatic cushioning means connecting the running gear and the frame at opposite sides of the frame, a conduit connecting the cushioning means at one side of the frame to the cushioning means at the other side thereof to permit the passage of fluid under pressure from one cushioning means to the other, a constricted orifice included in said conduit for controlling the passage of air under pressure therethrough, at least one clearance chamber communicating with the conduit on each side of said air controlling means, and a slow leak check valve interposed between the conduit and each clearance chamber to permit the free passage of air into the clearance chamber but to retard the return of such air to the conduit, said pneumatic suspension system being hermetically sealed with respect to the outer atmosphere during the normal operation thereof.

3. A vehicle comprising a running gear, and a frame, in combination with a pneumatic suspension system embodying a cushion interposed between the running gear and the frame at each side of the latter to carry the weight imposed by the frame on the running gear, and a conduit connecting the cushions at the opposite sides of the vehicle, said conduit having therein a constriction adapted to permit the passage of a given weight of air under relatively high instantaneous pressure therethrough at greater speed than the passage therethrough of air at prolonged lower pressures, and at least one clearance chamber having a valved connection with each cushion, said pneumatic suspension system being hermetically sealed with respect to the outer atmosphere during the normal operation thereof.

4. A vehicle comprising a running gear including an axle, and a frame, in combination with a pneumatic suspension system embodying upper cushions interposed between the axle and the frame to carry the weight of the frame, lower cushions interposed between the axle and the frame to cushion the movement of the frame away from the axle, and a conduit connecting the upper cushions to one another to permit fluid to flow from the cushion at one side of the frame into the cushion at the other side thereof, an orifice in said conduit to control the passage of air therethrough, said pneumatic suspension system being hermetically sealed with respect to the outer atmosphere during the normal operation thereof.

5. A vehicle comprising a running gear including an axle, and a frame, in combination with a pneumatic suspension system embodying upper cushions interposed between the axle and the frame to carry the weight of the frame, lower cushions interposed between the axle and the frame to cushion the movement of the frame away from the axle, and a conduit connecting the lower cushions to one another to permit fluid to flow from the cushion at one side of the frame into the cushion at the other side thereof, an orifice in said conduit to control the passage of air therethrough, said pneumatic suspension system being hermetically sealed with respect to the outer atmosphere during the normal operation thereof.

6. A vehicle comprising a running gear including an axle, and a frame, in combination with a pneumatic suspension system embodying upper cushions interposed between the axle and the frame to carry the weight of the frame, lower cushions interposed between the axle and the frame to cushion the movement of the frame away from the axle, and a conduit connecting the upper cushions to one another and another conduit connecting the lower cushions to one another to permit fluid to flow from the cushions at one side of the frame to the cushions at the other side thereof, an orifice in said conduit to control the passage of air therethrough, said pneumatic suspension system being hermetically sealed with respect to the outer atmosphere during the normal operation thereof.

7. A vehicle comprising a running gear including an axle, and a frame, in combination with a pneumatic suspension system embodying upper cushions interposed between the axle and the frame to carry the weight of the frame, lower cushions interposed between the axle and the frame to cushion the movement of the frame away from the axle, and a conduit connecting the upper cushions to one another and another conduit connecting the lower cushions to one another to permit fluid to flow from the cushions at one side of the frame to the cushions at the other side thereof, and means in each conduit for controlling the passage of air therethrough, said pneumatic suspension system being hermetically sealed with respect to the outer atmosphere during the normal operation thereof.

8. A vehicle comprising a running gear, a frame, and pneumatic cushions interposed between the running gear and the frame to carry the weight of the latter, said cushions having relatively stiff side walls and relatively yielding top and bottom walls.

9. A vehicle comprising a running gear, a frame, and pneumatic cushions interposed between the running gear and the frame to carry the weight of the latter, said cushions being of substantially upright, elliptical cross section and the side walls of which are of stiffer and less resiliency than the top and bottom walls.

10. A vehicle comprising a running gear, a frame, and pneumatic cushions interposed between the running gear and the frame to carry the weight of the latter, lower cushions interposed between the running gear and the frame to cushion the movement of the running gear in the direction of the frame, the upper cushions being of vertically elongated elliptical cross section with stiffened side walls, and the lower cushions being of substantially horizontally elongated elliptical cross section with walls of substantially uniform strength throughout.

11. A vehicle comprising a running gear provided thereon with a cushion carrier, a frame provided thereon with a cushion housing, elongated cushions interposed between the gear and the upper and lower portions of the housing, said housing and carrier having therein longitudinal channels and the cushions being provided with longitudinal ribs engaging with said channels to laterally centralize the cushions with respect to the gear and housing.

12. A vehicle comprising a running gear provided thereon with a cushion carrier, a frame provided thereon with a cushion housing, elongated cushions interposed between the gear and the upper and lower portions of the housing, said carrier and housing being formed to laterally interfit with the cushions to laterally centralize the cushions with respect to the carrier and housing.

13. A vehicle comprising a frame having thereon a cushion housing, the upper and lower portions of which are of curvilinear cross section to form upper and lower seats for enclosed cushions, an axle extending through the housing and provided therein with a cushion carrier of curvilinear transverse section to provide upper and lower seats for cushions positioned within the housing, upper and lower cushions interposed between the carrier and housing, and located respectively above and below the carrier to engage therewith and with the corresponding parts of the housing, said carrier extending through the opposite side walls of the housing and the housing being provided with an upright guide opening to guide the carrier during raising and lowering movements of the latter.

14. A vehicle comprising a frame having thereon a cushion housing, the upper and lower portions of which are of curvilinear cross section to form upper and lower seats for enclosed cushions, an axle extending through the housing and provided therein with a cushion carrier of curvilinear transverse section to provide upper and lower seats for cushions positioned within the housing, upper and lower cushions interposed between the carrier and housing, and located respectively above and below the carrier to engage therewith and with the corresponding parts of the housing, said carrier extending through the opposite side walls of the housing and the housing being provided with an upright guide opening to guide the carrier during raising and lowering movements of the latter, said carrier being also provided with arcuate bearing faces at its opposite sides adapted to coact with the interior of the lateral walls of the housing to limit lateral lost motion between the casing and the housing.

15. A vehicle comprising a frame, a multipart cushion housing, one section of which constitutes a permanent part of the frame and the other sections of which are secured to said part to form a substantially rigid housing, an axle extending through said housing, a cushion carrier mounted on the axle within the housing, thrust bearings formed conjointly on the housing and on the carrier to take propulsive thrusts, and upper and lower cushions positioned within the housing above and below the carrier and engaging therewith and with the top and bottom of the housing.

16. A vehicle comprising a frame having thereon a cushion housing, an axle extending through the housing and provided therein with a cushion carrier to provide upper and lower seats for cushions positioned within the housing, upper and lower cushions interposed between the carrier and housing, and located respectively above and below the carrier to engage therewith and with the corresponding parts of the housing, said carrier extending through the opposite side walls of the housing and the housing being provided with an upright guide opening to guide the carrier during raising and lowering movements of the latter.

17. A vehicle comprising a frame having thereon a cushion housing, an axle extending through the housing and provided therein with a cushion carrier to provide upper and lower seats for cushions positioned within the housing, upper and lower cushions interposed between the carrier and housing, and located respectively above and below the carrier to engage therewith and with the corresponding parts of the housing, said carrier extending through the opposite side walls of the housing and the housing being provided with an upright guide opening to guide the carrier during raising and lowering movements of the latter, said carrier being also provided with arcuate bearing faces at its opposite sides adapted to coact with the interior of the lateral walls of the housing to limit lateral lost motion between the casing and the housing.

18. A vehicle comprising a running gear incluring an axle, a frame, upper cushions interposed between the axle and the frame to carry the weight of the frame, lower cushions interposed between the axle and the frame to cushion the movement of the frame away from the axle, a conduit connecting the upper cushions to one another and another conduit connecting the lower cushions to one another, and adjustable differential mechanism connecting said conduits to one another to permit a lower pressure in one of said conduits to counterbalance a higher pressure in the other.

19. A vehicle comprising a running gear including an axle, a carrier on the axle, a frame, a housing enclosing the carrier carried by the frame, thrust bearings formed conjointly on the housing and on the carrier to take propulsive thrusts and a pneumatic cushion positioned between the housing and the carrier and completely enclosed by the housing to preclude the entry of dirt and other extraneous matter from contact with the cushion.

RENÈ GOUIRAND.